INVENTOR
Thomas P. Ford

UNITED STATES PATENT OFFICE.

THOMAS P. FORD, OF NEW YORK, N. Y.

PRESSURE-REDUCING VALVE.

971,982.    Specification of Letters Patent.    Patented Oct. 4, 1910.

Application filed December 11, 1909. Serial No. 532,584.

*To all whom it may concern:*

Be it known that I, THOMAS P. FORD, a citizen of the United States, and a resident of the city of New York, borough of Brooklyn, in the county of Kings and State of New York, have invented a new and Improved Pressure-Reducing Valve, of which the following is a full, clear, and exact description.

The object of the invention is to provide a new and improved pressure reducing valve, arranged to permit the operator to conveniently and quickly set the valve with a view to reduce the pressure of water, gas or other fluid flowing through the valve, to any desired degree, by using a valve arranged to open by initial pressure and to close by reduced pressure, the valve being controlled by pressure action on different piston areas having connection with the said valve, and being arranged to permit manual control for rendering any one of the pistons active at a time. This construction allows the opening of the valve to be greater for a given reduction than is possible where a valve is equipped with a spring, and used in connection with water pressure reduction. It is therefore particularly applicable as a pressure reducer in fire stand pipes in tall buildings, where the full pressure, due to the height of the building, would be dangerous to apply on fire hose nozzles at the lower floor or floors, and yet where conditions require that it is necessary that a valve be installed that will reduce the pressure without diminishing the supply to several fire nozzles, the installation of an intermediate tank at a given point in a building being thus entirely dispensed with.

A practical embodiment of the invention is represented in the accompanying drawings forming a part of this specification, in which similar characters of reference indicate corresponding parts in both views.

Figure 1:
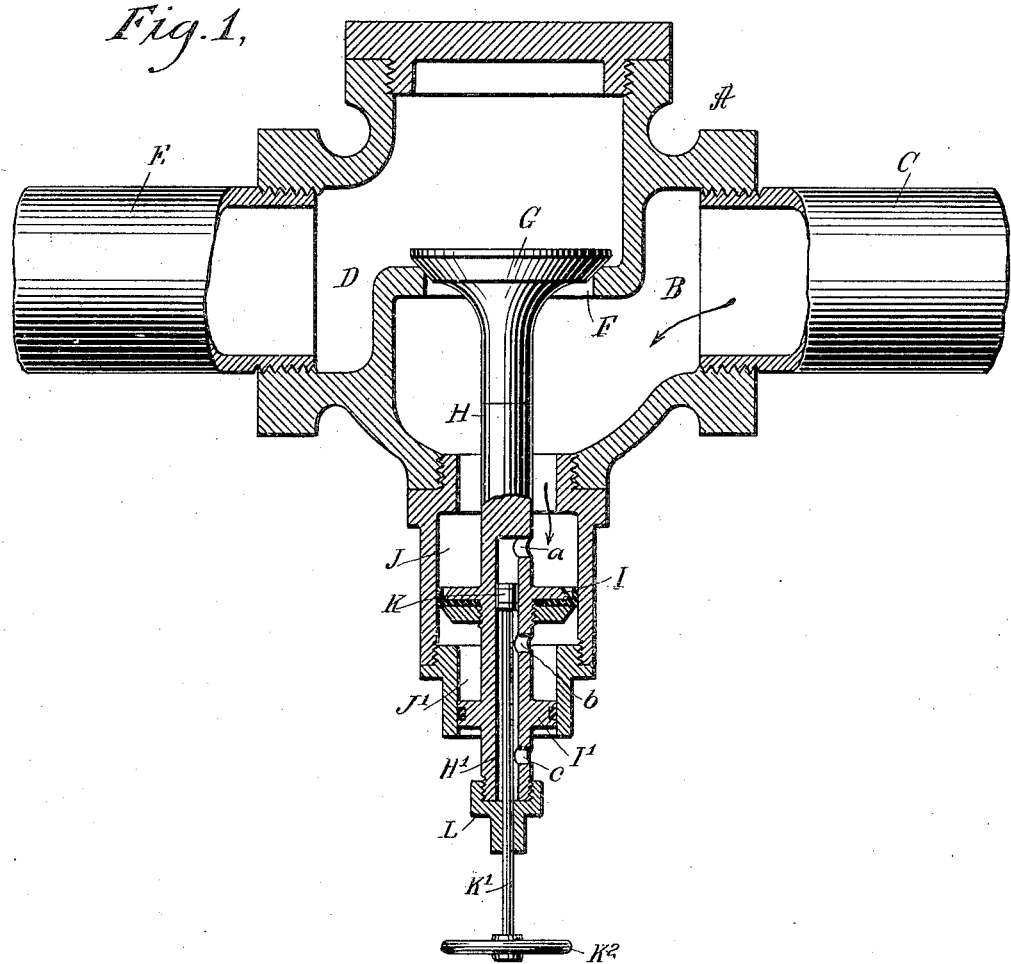
Figure 2:
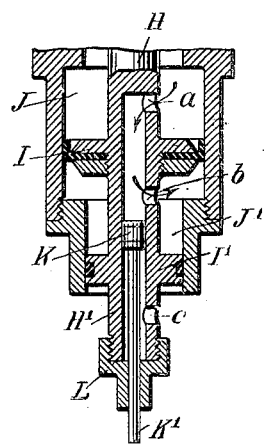

Figure 1 is a sectional side elevation of the reducing valve; and Fig. 2 is a similar view of the pressure devices in a different position from the one shown in Fig. 1.

The valve body A of the reducing valve is connected at its inlet B with a pipe C, leading to a source of fluid pressure supply, and the outlet D of the valve body A is connected with a pipe E for carrying the fluid under reduced pressure to a suitable place of discharge. Intermediate the inlet B and the outlet D is arranged a valve seat F, controlled by a valve G arranged in the outlet side of the valve body A and having its stem H extending through the valve seat F into the initial pressure side of the valve body A, as plainly indicated in Fig. 1. On the stem H are secured or formed the pistons I and I' of different diameters and fitted to travel in corresponding cylinders J and J', of which the cylinder J opens into the inlet or initial pressure side of the valve body A and is secured to the latter, while the cylinder J' opens at its inner end into the outer end of the cylinder J and is secured thereto, while the outer end of the cylinder J' is open to the atmosphere. The outer portion H' of the stem H is made hollow and provided with ports $a$, $b$ and $c$, of which the port $a$ opens into the inner end of the cylinder J, while the port $b$ opens into the space between the pistons I and I' and the outer port $c$ is open to the atmosphere. In the hollow portion H' of the stem H is mounted to slide a valve K, having its valve stem K' extending through a cap L, held on the outer end of the stem H, and the outer end of the stem K' is provided with a handle $K^2$ adapted to be taken hold of by the operator for shifting the valve K in the hollow portion H' of the stem H. Now, when the several parts are in the position shown in Fig. 1 and the fluid passes into the valve body A by way of the inlet B, then the valve G is opened by the action of the initial pressure on the said valve G, it being understood that the valve G has a larger area than the piston I, and the amount of said opening of the valve is in proportion to the amount of fluid required on the low pressure side to compensate for the discharge from the low pressure side. When the discharge is stopped, and the amount of reduced pressure on the outlet side of the valve G (which pressure acts on the entire area of the valve G) is sufficient to counterbalance the high pressure, which is acting on a resultant area that is equal to the difference between the area of the valve G and the area of the piston I, then the entire mechanism moves to a closed position. It is obvious therefore that the valve will close at a pressure less than the inlet pressure, because on the inlet or high pressure side the operative area for pressure to act on is the difference of areas between the valve G and the piston I, while on the outlet or reduced pressure side the pressure acts on the entire area of the valve G.

From the foregoing it will be seen that the fluid passes under reduced pressure into the outlet D and to the place of discharge, and when it is desired to carry a higher reduced pressure at the outlet side D, then the operator moves the handle $K^2$ in an outward direction until the valve K has passed the port $b$ (see Fig. 2), that is, the fluid also passes from the inner end of the cylinder J by way of the port $a$, the hollow stem portion H' and port $b$ into the space between the pistons I and I', so that pressure on both faces of the piston I is equalized at initial or high pressure, while this pressure is exerted against the inner face of the piston I', and as the latter is smaller than the piston I, it is evident that the valve G, by a preponderance of a pressure to open it, which preponderance is greater than was the case when the larger piston I is engaged, will require a higher reduced pressure on the outlet side and acting upon the entire surface of the valve G to balance or close it. It is therefore obvious that a plurality of surfaces of different areas can be included in the construction, and that the introduction of any one of these surfaces will produce different outlet or reduced pressures.

It is understood that when the valve K is in the position shown in Fig. 1, the outer face of the piston I, both faces of the piston I' and the outer face of the valve K are exposed to atmospheric pressure, and when the valve K is moved to the position shown in Fig. 2, only the outer faces of the piston I' and the valve K are exposed to atmospheric pressure. Thus one side of one of the pistons is always exposed to atmospheric pressure, while at least one inner face of one of the pistons is exposed to the pressure of the fluid passing into the valve body A. Thus from the foregoing, it will be seen that by the arrangement described no springs, weight levers and similar devices are required for obtaining reduced pressure, and it is only necessary for the operator to shift the valve K, to set the reducing valve to the desired pressure at which the fluid is to be delivered.

Having thus described my invention, I claim as new and desire to secure by Letters Patent:

1. A pressure reducing valve, comprising a valve body having a seat, an inlet and an outlet, a valve controlling said seat and movable in the outlet side of the valve body, and a plurality of manually-controlled pistons of different areas connected with the said valve at the inlet side of the valve body and bodily moving with the said valve, only one of the said pistons being active at a time under the influence of the initial pressure of the fluid, the area of the largest of the said pistons being less than the area of the said valve, the said valve and the said pistons being directly and solely controlled by fluid pressure, so that the valve opens under the influence of initial pressure of the fluid and closes on reduced pressure of the fluid.

2. A pressure reducing valve, comprising a valve body having a seat, an inlet and an outlet, a valve controlling the said seat and movable in the outlet side of the valve body, a plurality of pistons in the inlet side of the valve body and of different areas, and a stem connecting the pistons with each other and with the said valve by way of the said valve seat, only one of the said pistons being at a time under the influence of the initial pressure, the area of the largest of the said pistons being less than the area of the face of the said valve at the initial pressure side of the valve body, the area of the face of the valve at the reduced pressure side of the valve body being greater than the difference in area between the active piston and the face of the valve at the initial or high pressure side of the valve body, the said valve and the said pistons being directly and solely controlled by fluid pressure, the valve opening under the influence of initial pressure and closing under reduced pressure.

3. A pressure reducing valve, comprising a valve body having a seat, an inlet and an outlet, a valve controlling the said seat and movable in the outlet side of the valve body, a plurality of pistons in the initial side of the valve body and of different areas, a stem connecting the pistons with each other and with the said valve by way of the said valve seat, only one of the said pistons being at a time under the influence of the initial pressure, the area of the largest of the said pistons being less than the area of the face of the said valve at the initial pressure side of the valve body, the area of the face of the valve at the reduced pressure side of the valve body being greater than the difference in area between the active piston and the face of the valve at the initial or high pressure side of the valve body, and manually-controlled means for rendering one only of the said pistons active at a time relative to the fluid at initial pressure, the said valve and the said pistons being directly and solely controlled by fluid pressure, the valve opening under the influence of initial pressure and closing under reduced pressure.

4. A pressure reducing valve, comprising a valve body having a seat, a high pressure inlet side and a low pressure outlet side, a valve controlling the said seat and movable in the said low pressure side, a plurality of pistons in the said high pressure side and of different areas, only one of the said pistons being at a time under the influence of the high pressure of the fluid, and the opposite side of at least one of the said pistons being under atmospheric pressure, a stem common to the said pistons and the said valve, the stem connecting with the valve at the high pressure face thereof, the area of the largest of the said pistons being less than the area of the high pressure face of the valve and the area of the reduced pressure face of the valve being greater than the difference in area of the active piston and the high pressure face of the valve, and manually-controlled means for rendering only one of the said pistons active at a time relative to the fluid at high pressure, the said valve and the said pistons being directly and solely controlled by fluid pressure, the valve opening under the influence of initial pressure and closing under reduced pressure.

5. A pressure reducing valve, comprising a valve body having a seat, a high pressure inlet side and a reduced pressure outlet side, a valve controlling the said seat and movable in the reduced pressure side of the valve body, a plurality of cylinders at the said high pressure inlet side and having bores of different diameters, pistons in the said cylinder bores, one of the pistons being active at a time under the influence of the high pressure of the fluid, and a stem common to the said pistons and the said valve and connecting with the said valve at the high pressure side thereof, the area of the largest of the said pistons being less than the area of the high pressure side of the valve and the area of the reduced pressure face of the valve being greater than the difference in the area of the active piston and the high pressure side of the valve, the said valve and the said pistons being directly and solely controlled by fluid pressure, the valve opening under the influence of initial pressure and closing under reduced pressure.

6. A pressure reducing valve, comprising a valve body having a seat, a high pressure inlet side and a reduced pressure outlet side, a valve controlling the said seat and movable in the reduced pressure side of the valve body, a plurality of cylinders at the said high pressure inlet side and having bores of different diameters, pistons in the said cylinder bores, only one of the pistons being active at a time under the influence of the high pressure of the fluid, and a stem common to the said pistons and the said valve and connecting with the said valve at the high pressure side thereof, the outer portion of the said stem being hollow and provided with ports opening into the bores of the cylinders, and a manually-controlled valve slidable in the said hollow stem portion, the area of the largest of the said pistons being less than the area of the high pressure side of the valve, and the area of the reduced pressure face of the valve being greater than the difference in the area of the active piston and the high pressure side of the valve.

In testimony whereof I have signed by name to this specification in the presence of two subscribing witnesses.

THOMAS P. FORD.

Witnesses:
 THEO. G. HOSTER,
 PHILIP D. ROLLHAUS.